Figure 1:
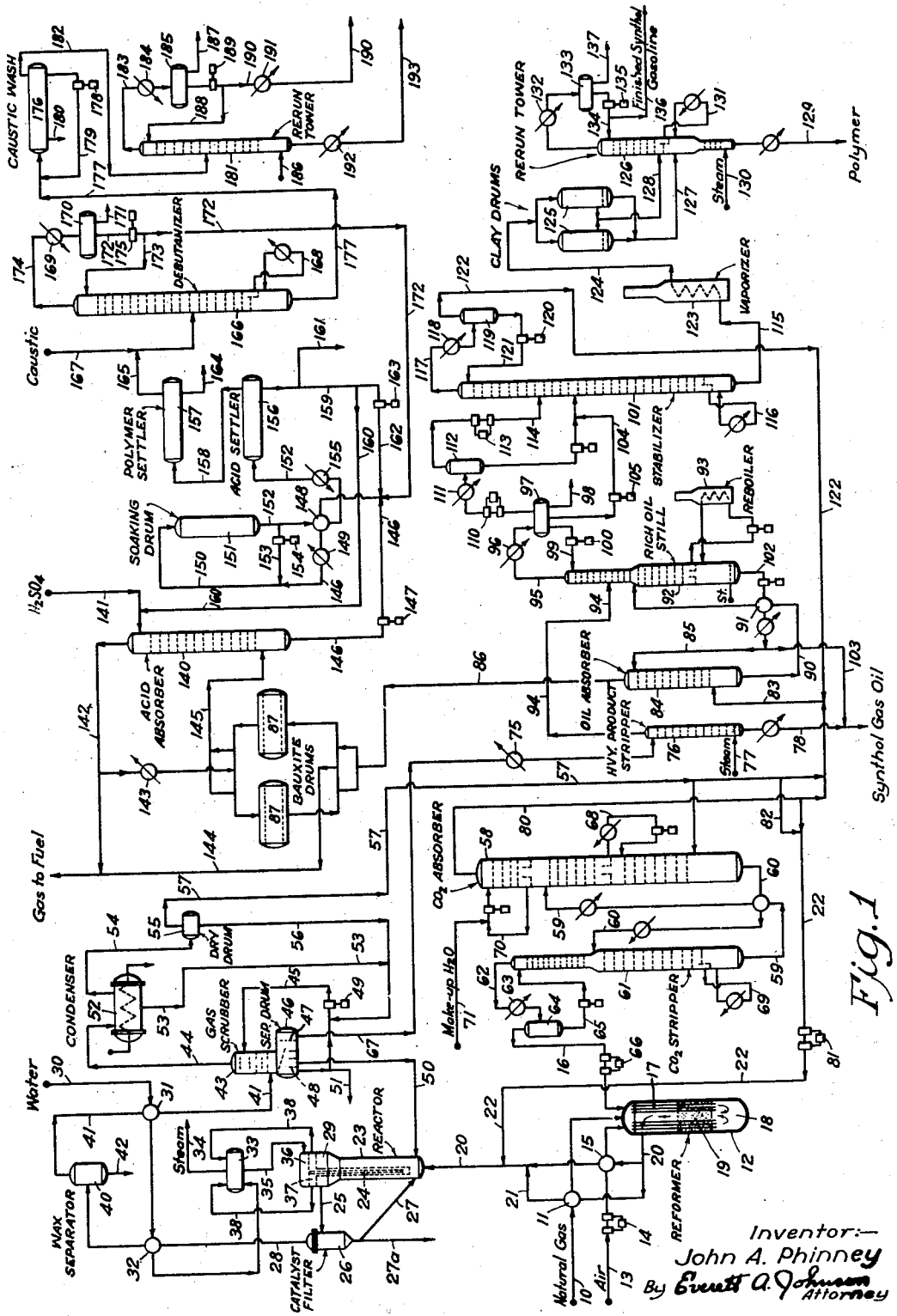

Dec. 5, 1950     J. A. PHINNEY     2,532,514
METHOD AND APPARATUS FOR MAKING HYDROGEN-CARBON
MONOXIDE MIXTURES

Filed Aug. 14, 1945     3 Sheets-Sheet 1

Inventor:—
John A. Phinney
By Everett A. Johnson
Attorney

Inventor:—
John A. Phinney
By Everett A. Johnson
Attorney

Dec. 5, 1950 J. A. PHINNEY 2,532,514
METHOD AND APPARATUS FOR MAKING HYDROGEN-CARBON
MONOXIDE MIXTURES
Filed Aug. 14, 1945 3 Sheets-Sheet 3

Inventor:—
John A. Phinney
By Everett A. Johnson
Attorney

Patented Dec. 5, 1950

2,532,514

UNITED STATES PATENT OFFICE 2,532,514

METHOD AND APPARATUS FOR MAKING HYDROGEN-CARBON MONOXIDE MIXTURES

John A. Phinney, Tulsa, Okla., assignor to Stanolind Oil and Gas Company, Tulsa, Okla., a corporation of Delaware Application August 14, 1945, Serial No. 610,845

4 Claims. (Cl. 48—196)

This invention relates to hydrocarbon synthesis and it pertains more particularly to an improved method and means for effecting the synthesis of hydrocarbons on a commercial scale from hydrogen and carbon monoxide.

The synthesis is exothermic and the synthol process as heretofore known to the art has been extremely cumbersome and expensive so that it has not been considered economical for use in the United States. Therefore an object of my invention is to provide a simplified and improved hydrocarbon synthesis system employing natural gas as the feed which is commercially attractive in this country.

In the hydrocarbon synthesis reaction large amounts of heat are liberated and it is not only necessary to remove this vast amount of heat but it is also necessary that the conversion temperature be maintained within relatively narrow limits. Therefore it is an object of this invention to provide a system wherein the synthesis temperature may be controlled and maintained within the desired limits.

In the preparation of hydrogen and carbon monoxide gas mixtures through the partial oxidation of methane with air, it is necessary to remove the synthesis gas at high temperature, e. g., 1800° F. or higher, to obtain gas of a satisfactory composition. The reaction $$CH_4 + .5O_2 \rightarrow CO + 2H_2 \qquad (1)$$

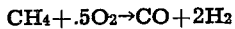

is not sufficiently exothermic to attain this high outlet temperature without preheating the reactants to a temperature of between about 1000 and 1200° F. Preheating the reactants to a higher temperature has additional advantages since it permits the utilization of carbon dioxide made in the synthesis to produce additional quantities of carbon monoxide by the endothermic reaction $$CH_4 + CO_2 \rightarrow 2CO + 2H_2 \qquad (2)$$

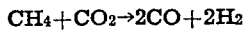

Various systems have heretofore been proposed for the reaction of methane with air or oxygen and for the exchange of heat between hot products and cold reactants. The prior art systems, however, have a number of disadvantages. For example, the preheating of natural gas to temperatures above about 1400° F. tends to deposit carbon by the cracking of methane and heavier hydrocarbons. The accumulation of carbon in the preheating tubes results in poor heat transfer and ultimately in plugging of the tubes. In the prior art chambers the operation depends on the propagation of a flame within the chamber whereby oxygen is completely consumed before the gases pass into the main body of the chamber. In some other modifications cold oxygen or air is charged to a burner where combustion takes place with a preheated gas. If the flame is extinguished for any reason the possibility arises for mixtures of unreacted oxygen and hydrocarbon gas to fill the vessel with the result that an explosion occurs when the mixture comes in contact with a hot surface.

Therefore, another object of the invention is to provide an improved system for converting hydrocarbon gas such as natural gas containing methane into mixtures of hydrogen and carbon monoxide suitable for use in the synthesis of hydrocarbons. These and other objects will become apparent as the detailed description of this invention proceeds.

In general, the objects of this invention are attained by separately preheating air, natural gas and recycle carbon dioxide by heat exchange with hot synthesis gas, combining the preheated gases and reacting them over a catalyst at about 1900° F. Prior to the preheating by heat exchange with the product gases, the air, hydrocarbons and carbon dioxide are heated to about 850° F. being increased to a temperature of about 1625° F. in the heat exchange tubes. The gaseous product mixture leaves the exchanger at about 1000° F. and is supplied to a hydrocarbon synthesis zone after further cooling to about 400° F. The hydrocarbon synthesis is conducted in the presence of a finely divided catalyst maintained in a dense turbulent suspended phase and cooling tubes are provided for the extraction of the exothermic heat of reaction.

The catalyst for synthesis reaction can be either of the cobalt type or of the iron type. The cobalt type promotes the reaction:

$$2xH_2 + xCO \rightarrow (CH_2)_x + xH_2O \qquad (3)$$

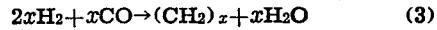

and the iron type catalyst promotes the reaction:

$$3xH_2 + 3xCO \rightarrow 2(CH_2)_x + xH_2O + xCO_2 \qquad (4)$$

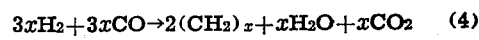

In either case the catalyst should be in finely divided form so that it can be fluidized by gases or vapors flowing upwardly through the catalyst at low velocity. The use of catalyst particles of such structure, shape, and size as to be fluidized by upflowing gases of the defined velocities is an important feature of the invention.

The temperature of the synthesis step when employing an iron type catalyst usually is within a range of between about 450 and about 675° F.; for example, about 550° F.

With a cobalt type catalyst the temperature of the synthesis step is usually within the range of about 225 and 450° F., for example, between about 325 and 395° F. The lower temperatures tend toward the production of heavier hydrocarbons such as waxes and the higher temperatures tend toward the production of lighter hydrocarbons such as gases with the optimum liquid yield being obtained within the preferred range of 325 to 395° F.

The preferred raw material for the production of carbon monoxide and hydrogen is natural gas, but carbon monoxide-hydrogen mixtures can be prepared from other sources. Some natural gases such as those obtained from the Hugoton field are of low sulfur content and need not be desulfurized. When necessary, however, the natural gas is first freed of hydrogen sulfide and organic sulfur compounds by conventional desulfurization processes.

As pointed out above, a considerable amount of heat must be supplied for the gas reforming operation and this heat is preferably obtained by heat exchange with the hot gas reforming products. The hot gases are passed through a catalyst bed. The catalyst is preferably a group VIII metal or metal oxide which can be either unsupported or supported on clay, kieselguhr, silica gel, alumina, Super Filtrol, and the like. The catalyst can be promoted by a metal or metal compound, for example, the oxide of aluminum, magnesium, uranium, chromium, molybdenum, vanadium, and the like.

The space velocity through the gas reforming catalyst should be sufficient to give a contact time of between about 0.1 and about 45, for example, between about 0.4 to about 10 seconds. The temperature of this operation is preferably at between about 1500 and about 2100° F., for example, 1900° F. and the outlet pressure may be as high as about 250 pounds per square inch, for example, about 225 pounds per square inch. This reforming operation converts the methane-carbon dioxide-air mixture into a gas consisting chiefly of hydrogen, carbon monoxide, and diluent nitrogen, this gas mixture being hereinafter referred to as "synthesis feed gas."

The synthesis feed gas is cooled and introduced into the synthesis reactor where it is exothermically reacted in the presence of a finely divided catalyst. In order to prevent the temperature level of the reactor from gradually increasing, i. e., to remove the heat of exothermic reaction, a plurality of individually controlled bayonet type cooling tubes may be extended into the mass of turbulent catalyst.

In systems of this type catalyst solids of small particle size are fluidized by upflowing gasiform materials within the reactor so that the catalyst within the reactor is maintained in a turbulent liquid-like dense phase, the extreme turbulence of the suspended catalyst particles serving to maintain substantially the entire mass of catalyst at a uniform temperature. The catalyst particles are of the order of 2 to 200 microns or larger, preferably 20 to 100 microns in particle size. With vertical gasiform fluid velocities of the order of about 0.5 to 5, preferably between about 1 and 4, for example, about 2 feet per second, a liquid-like dense phase of catalyst is obtained in which the bulk density is between about 30 and about 90 per cent, preferably between about 40 and about 80, e. g., about 60 per cent of the density of the settled catalyst material. The vertical velocity of the gasiform fluids is in any event regulated so as to produce a turbulent suspension of catalyst within the reactor.

An active iron type catalyst can be prepared by a number of methods well known in the art and can, for example, be of the precipitated type supported on Super Filtrol or other carriers. Alternatively an iron catalyst of the type used for ammonia synthesis can be employed, such catalyst ordinarily being prepared by oxidizing iron in a stream of oxygen, fusing the oxide and crushing. The catalyst can be reduced before use, preferably with hydrogen, at a temperature of between about 600 and 1500° F. If desired make-up catalyst can be supplied to the reactor as the oxide, the oxide undergoing reduction within the reactor. Various promoters such as alkali metal compounds may be added. Another method employs the decomposition of iron carbonyl to form an iron powder which may be sintered and ground. Catalyst particles without a support may have a bulk density as high as about 120 to 150 pounds per cubic foot, whereas the bulk density of iron catalyst supported on Super Filtrol or similar carrier may be as low as about 10 pounds per cubic foot.

It is also contemplated that a cobalt type catalyst can be used consisting essentially of supported cobalt metal either with or without one or more promoters such as oxides of aluminum, cerium, magnesium, manganese, thorium, titanium, uranium, zinc, zirconium, and the like. The cobalt support is preferably an acid-treated bentonite or clay such as Super Filtrol or other material of low calcium or iron content. Other supports include materials such as koalin, alumina, silica, magnesia, and the like. The cobalt-to-carrier ratio may be varied between about 5 to 1 and 0.1 to 1. The catalyst may be reduced before use, preferably with hydrogen at a temperature of between about 350 and about 500° F. Likewise the reduction can be carried out within the reactor proper with the synthesis gas as the reducing medium.

Instead of the cobalt or iron catalyst, I may employ catalyst of the nickel type or the ruthenium type. The above catalysts are all known to the art and inasmuch as no invention is claimed in their composition or method of preparation, further description is not believed necessary.

Figure 2:
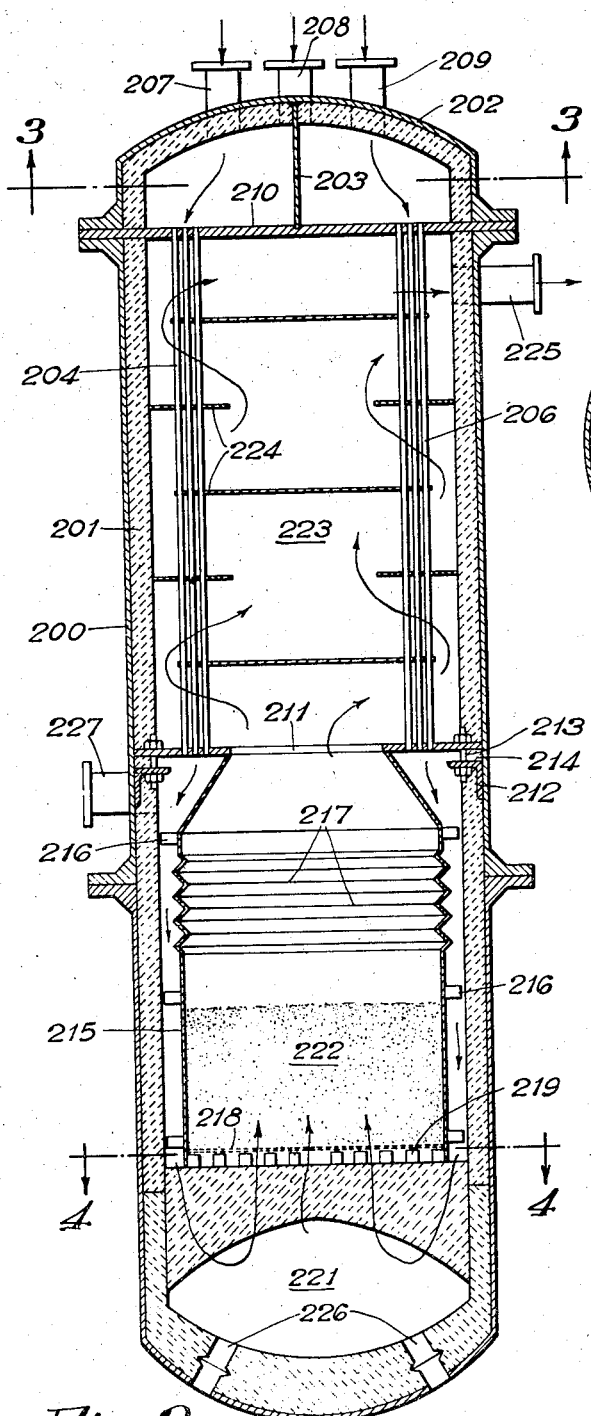
Figure 3:
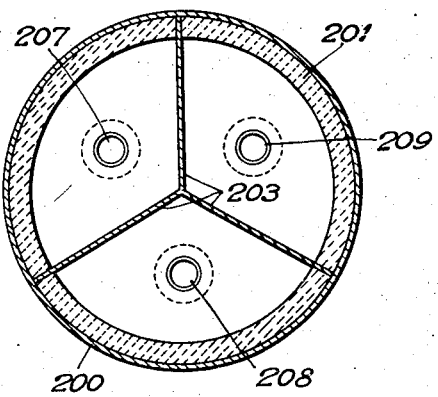
Figure 4:
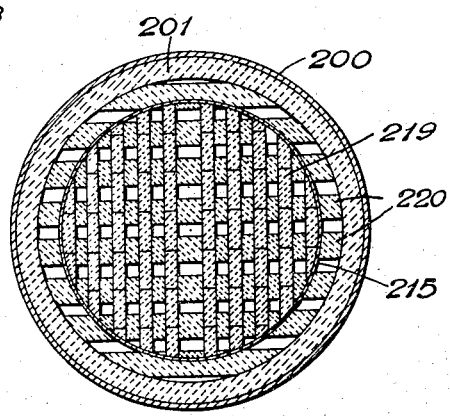
Figure 5:
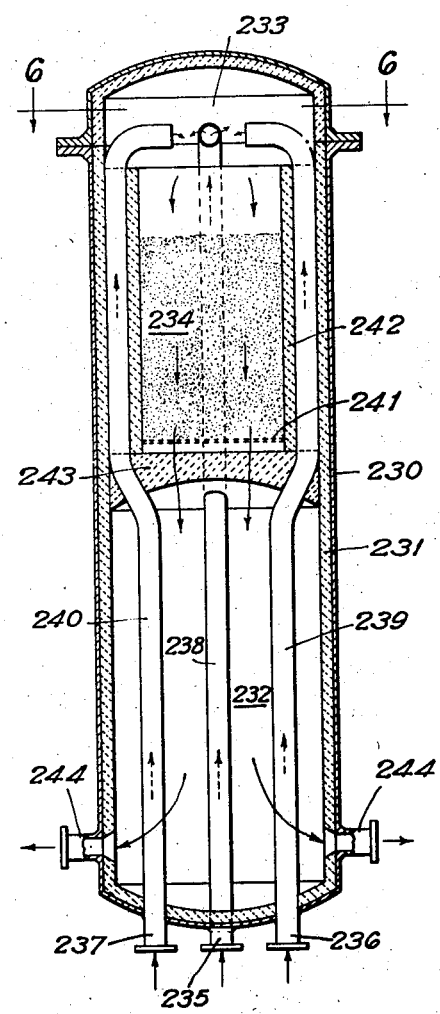
Figure 6:
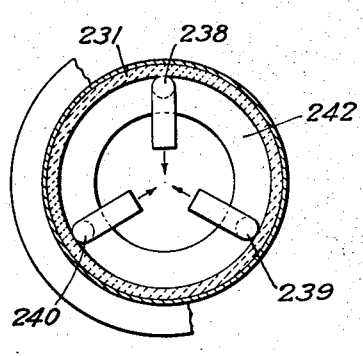

The invention will be more clearly understood from the following detailed description read in conjunction with the accompanying drawings which form a part of the specification and wherein:

Figure 1 is a schematic flow diagram of a complete process design for practicing the invention;

Figure 2 is an enlarged view of the feed gas preparation unit and Figures 3 and 4 are sections taken along the lines 3—3 and 4—4 respectively;

Figure 5 is a diagrammatic representation of another modification of a gas reforming apparatus; and Figure 6 is a partial section along the line 6—6 in Figure 5.

In the specific example a system will be described for handling natural gas which consists essentially of methane. The application of the invention to other charging stocks and to plants of different capacity will be apparent to those skilled in the art.

The charging stock is introduced via line 10, passed through product heat exchanger 11 and introduced into the reformer 12 at a temperature of about 800° F. and a pressure of about 240 pounds per square inch. In some instances it will be necessary to desulfurize the natural gas before it is supplied to the system and in such an event any conventional desulfurization system can be used. Air is supplied via line 13 to the compressor 14 which may be in two or more stages. The air is withdrawn from compressor 14 at a temperature of about 390° F. under a pressure of about 250 pounds per square inch. This high pressure air is supplied via line 13 to the reformer 12 after passing through product heat exchanger 15 wherein the temperature is increased to about 850° F. Recycle carbon dioxide is supplied at a pressure of about 240 pounds and at a temperature of about 380° F. via line 16. This substantially pure carbon dioxide is obtained by means of absorbing the $CO_2$ from a portion of a recycle gas fraction returned to the hydrocarbon synthesis step.

The reformer 12 is provided with a header 16, the gases being introduced into separate tubes 17 wherein the gases supplied by lines 10, 13, and 16 are preheated separately to at least 1500° F. The gases thus preheated pass downwardly from the preheat tubes 17 at high velocity and enter a reaction space 18. The lower ends of the tubes 17 pass through a catalyst bed 19 supported intermediate the ends of reformer 12. When the air and methane are preheated separately to at least 1500° F. the air-methane mixtures of widely varying composition are spontaneously inflammable and when the preheated gases enter the reaction space 18 the oxygen is immediately consumed. The partially reacted gases from the reaction zone 18 are thoroughly mixed and enter the bed of catalyst 19 where the conversion of residual methane, carbon dioxide, and water vapor to hydrogen and carbon monoxide is effected. A suitable catalytic material for this purpose is nickel on high temperature fire brick or the like. The product gas, leaving the catalyst bed 19, then passes countercurrent to the incoming gases within tubes 17. A temperature of about 1900° F. is maintained within the catalyst bed 19 and heat is extracted by the incoming gases in tubes 17 to attain a temperature of above 1500° F., for example, about 1620° F. in the tubes 17. The product gases then leave the chamber 12 via line 20 at a temperature of about 1000° F. and under a pressure of about 225 pounds per square inch.

Natural gas in being heated to about 1500° F. deposits carbon on the walls of the preheating tubes 17 and if the carbon is allowed to accumulate it would render the unit inoperable. To avoid the continued deposition of coke, natural gas and air are alternately passed through the tube, the air removing the carbon as carbon dioxide. The reformer 12 includes three separate preheating sections 17, each section handling alternately hydrocarbons, carbon dioxide and air, and carbon dioxide in sequence to avoid mixing any air and hydrocarbon gas in any preheating section. The flow through the selected preheating tubes 17 may be controlled by an automatic timing device (not shown). Although banks of tubes are shown for each section, it is contemplated that a single tube can be used in each section in place of the banks of tubes.

The product gases in line 20 from reformer 12 are split and a portion passed via line 21 through heat exchanger 11 and another portion through heat exchanger 15. The product gases are thence cooled, commingled with recycle gas from line 22 and introduced into the synthesis reactor 23. A fluidized bed of synthesis catalyst such as finely divided iron is maintained within this reactor 23 which also contains bayonet tubes 24 to remove the heat of reaction by the generation of steam.

The synthesis gas stream in line 20 is introduced into the reactor 23 at a low point therein, preferably through a distributor plate. The reactor 23 comprises an elongated vessel having an enlarged upper section 29 wherein the catalyst settles out from the reaction products by reason of the reduced velocity therein. The velocity reduction results from the reduction in volume of the reactant gases and from the increased cross-sectional area of the reactor 23. The reaction conditions and the properties of the catalyst phase within the reactor 23 may be substantially the same as described in general terms above. Cooling is effected within the reactor 23 by a number of bayonet or thimble tubes 24, the cooling tubes 24 extending through this enlarged settling zone 29 and into the dense catalyst phase.

Boiler feed water is introduced via line 30 at about 100° F. under a pressure of about 400 pounds per square inch. The feed water passes through the heat exchangers 31 and 32 and is introduced into the steam drum 33 at about 450° F. and at about 420 pounds per square inch. 400 pounds steam is withdrawn via line 34 from the steam drum 33.

Cooling water is supplied by line 35 to the manifold section 36 of the cooling system, said manifold communicating with the inner tubes of the thimble assemblies 24. If desired the manifold 36 may be divided into a plurality of zones whereby separate banks of tubes 24 can be independently controlled. The heat exchange medium passes downwardly within the inner tube and flows upwardly within the outer tube into the manifold 37. The relatively hot heat exchange fluid which in the case of water will be converted into steam is withdrawn from the manifold 37 via lines 38 into steam drum 33. Condensed water is recycled via line 35 from the steam drum 33 to the manifold 36.

Reaction products from which a substantial portion of the catalyst has been removed are withdrawn through line 25 and introduced into an external catalyst separation means 26. This system may comprise a plurality of stages of cyclones, ceramic catalyst filters, or the like and it should be understood that the means 26 can be mounted within the reactor 23, for example, within the space provided by the enlarged settling zone 29. A substantially catalyst-free reactant effluent is removed by conduit 28 for further processing. It is preferred to transfer the recovered catalyst via line 27 or its equivalent into the dense phase turbulent suspended catalyst maintained within the reactor 23. If desired the recovered catalyst may be withdrawn from the system via line 27a for regeneration and the like before recycle, but normally the catalyst is maintained within the system for extended periods of time.

The gasiform product in line 28 is cooled in heat exchanger 32 and introduced into wax knock-out drum 40. The drum 40 can be operated at a pressure of about 195 pounds per square inch and hydrocarbon products boiling above 400° F. are removed via line 42. The products boiling below 400° F. are withdrawn from the wax separator 40 via line 41, passed in heat exchange with boiler feed water in exchanger 31 and charged in the vapor state to a scrubber tower 43. The vapors enter gas scrubber 43 at a temperature of about 275° F. and the scrubbed gases are removed therefrom by line 44 at a temperature of about 240° F. Within the scrubber 43 partial condensation takes place and the product liquid and gas are scrubbed by a recycle water stream to remove traces of catalysts and oxygenated compounds, the scrubber water being introduced into the tower 43 via line 45. The liquid products and condensed water enter the separator drum 46 which is provided with baffles 47 and 48 whereby the mixed water and hydrocarbons are separated to concentrate the catalyst particles which are withdrawn as a catalyst water slurry via line 50 and returned into the reactor 23. The water fraction is withdrawn via line 45 and recycled by pump 52 to the scrubber 43. The net water separated in drum 46, containing the oxygenated compounds, is withdrawn via line 51 and is removed for further treatment as desired.

The gases from the scrubber 43 are passed via line 44 through condenser 52 where water is removed from the gases for recycle via line 53 and line 45 to the scrubber 43. The gases from condenser 52 are removed at a temperature of about 100° F. and 185 pounds per square inch via line 54 into water knock-out or dry drum 55. In the dry drum 55 residual water is removed and recycled via line 56. Following the mist extraction in drum 55, all or part of the gases are passed by line 57 into a carbon dioxide absorber 58. The lean absorber medium is introduced to absorber 58 via line 59. The absorber is operated at a slightly elevated temperature, say 130-150° F. to avoid hydrocarbon condensation. The $CO_2$-rich absorber medium is withdrawn from the absorber 58 via line 60 and supplied to the carbon dioxide stripper 61. Carbon dioxide is removed from stripper 61 via line 62 at a temperature of about 230° F. and a pressure of about 55 pounds per square inch. The effluent is cooled in cooler 63 and introduced into separator drum 64. The gaseous carbon dioxide is removed by line 16 from the drum 64 at about 100° F. and about 50 pounds per square inch. The liquid from drum 64 is pumped through line 65 into the stripper 61. The carbon dioxide in line 16 is compressed by means of compressor 66 to about 240 pounds per square inch whereby it is heated to about 380° F. This high pressure carbon dioxide is recycled to the reformer 12 by line 16.

The hydrocarbon liquid fraction recovered from separator drum 46 is carried by line 67 through heater 75 and supplied to the heavy products stripper 76. The liquid product is introduced at about 350° F. and the stripper 76 is operated at about 10 pounds per square inch. Steam is supplied to the stripper by line 77. The bottoms from the stripper 76 are withdrawn via line 78 to storage and comprise a synthol gas oil.

The gases in line 57 which are not subjected to carbon dioxide recovery are either recycled to the reactor 23 via line 22 or sent to the product recovery system. The portion which is recycled to the reactor 23 is blended with the $CO_2$-free gases recovered via line 80 from the $CO_2$ absorber 58. These recycled gases are compressed by compressor 81 and introduced into the reactor feed line 20 at about 220 pounds per square inch.

The product gases in lines 57 and 83 are introduced into the oil absorber 84 and scrubbed with an absorber oil introduced through line 85 for the recovery of condensable hydrocarbons. In the oil absorption system, 90 per cent recovery of net pentanes is attained. The unabsorbed gases which leave the top of the absorber 84 through line 86 are supplied to the drying drums 87.

The rich absorber oil is withdrawn from absorber 84 via line 90 and passes through heat exchanger 91 to rich oil still 92 provided with reboiler 93. The lighter products stripped from the gas oil fraction in the heavy products stripper 76 are passed via line 94 into the rich oil still 92 at a high point therein. Stripping steam can be introduced into rich oil still 92 via line 92a and the overhead from the still 92 passes via line 95 through cooler 96 into separator-reflux drum 97. The drum 97 is adapted to effect separation between hydrocarbons and water and the water fraction is removed via line 98. This fraction is rich in oxygenated compounds which can be recovered as useful products. A reflux fraction is passed via line 99 and pump 100 into the rich oil still 92. The net hydrocarbons withdrawn overhead from the still 92 ultimately are introduced into the stabilizer 101.

The product liquid is fractionated to slightly above 400° F. EP gasoline in the rich oil still 92, the net gas oil being removed as a part of the lean oil via line 102 from the tower bottom. The bottoms from the still 92 are passed in heat exchange with the rich oil in line 90 and pumped to the top of the absorber 84 via line 85. The net gas oil product can be withdrawn via line 103 with the stripped heavy product in line 78 from the stripper 76.

The raw synthol gasoline and light ends are compressed to 235 p. s. i. and stabilized, the overhead product of propanes and butanes being recycled to the absorber. This operation is actually a debutanization, the highly unsaturated butane fraction being desirable as a charge to the polymerization section.

The liquid hydrocarbons recovered in drum 97 are withdrawn via line 104 and passed via pump 105 into the stabilizer 101 together with hydrocarbons from knock-out drum 112. The gases from drum 97 are compressed by compressor 110, passed through cooler 111, and introduced into knock-out drum 112. The uncondensed fraction is compressed by compressor 113 and raised to a pressure of about 250 pounds per square inch and a temperature of about 295° F. This fraction is introduced into the stabilizer 101 via line 114. A stabilized gasoline fraction is withdrawn from stabilizer 101 via line 115 at a temperature of about 370° F. and a pressure of about 235 pounds per square inch. A reboiler 116 is provided on stabilizer 101. The overhead from stabilizer 101 is withdrawn at a temperature of about 200° F. and a pressure of about 240 pounds per square inch via line 117 through cooler 118 into reflux drum 119. The reflux liquid is withdrawn from the bottom of 119 and passed by pump 120 and line 121 into the stabilizer 101. The stabilizer gases are removed from reflux drum 119 by line 122 and recycled to the oil absorber 84 where the uncondensable gases are purged from the absorber-stabilizer system and passed via line 86 to the bauxite drums 87.

The stabilized hydrocarbon fraction in line 115, which comprises approximately equal proportions of $C_5$, $C_6$ and $C_{7+}$ hydrocarbons, are vaporized in furnace 123 and introduced by line 124 into clay-treating drums 125. The clay-treated fractions are introduced into rerun tower 126 via lines 127 and 128. A reboiler 131 supplies heat to the rerun tower. Steam is introduced at a low point in the rerun tower 126 by line 130 whereby the polymer fraction is stripped and a polymer fraction is withdrawn as bottoms from rerun tower 126 via line 129. A finished synthol gasoline fraction is withdrawn overhead from rerun tower 126, cooled in 132 and introduced into accumulator drum 133. A portion of the product liquid can be passed via line 134 and pump 135 into the rerun tower 126 as reflux, whereas the net production of finished synthol gasoline is withdrawn by line 136. Steam condensate is withdrawn from drum 133 by line 137.

The off gases in line 86 from the oil absorber 84 contain the net $C_4$ and lighter hydrocarbons. These gases are dried by passage through a bauxite system comprising drums 87. The clay in drums 87 is periodically and alternately regenerated by passing hot residual gases from the sulfuric acid absorber through the bauxite drums in a direction countercurrent to the normal flow of gases. The dry gases are charged to an acid absorber 140 by line 145 where the unsaturated light hydrocarbons are absorbed in recirculated and fresh 98% sulfuric acid supplied by line 141. The absorber 140 is operated at about 250 pounds per square inch and at a temperature of about 100° F. The lean gases are withdrawn from the acid absorber 140 via line 142 and can be utilized as fuel or heated in 143 and used as a regeneration gas for the bauxite drums 87, the regeneration gases and moisture being sent by line 144 to fuel.

The rich acid from the acid absorber 140 is transferred via line 146 and pump 147 through heat exchanger 148 and heater 149 wherein the temperature is increased from about 100° F. to about 200° F. The heated rich acid in line 150 is then introduced into the upper portion of the polymerization reactor or soaking drum 151 which is maintained under a pressure of about 550 pounds per square inch and a temperature of about 200° F. Under the conditions within the soaking chamber 151 the butylenes are converted almost completely while propylenes are converted only partially.

The reaction products stream withdrawn via line 152 from soaking drum 151 is split with one portion being recycled via line 153, pump 154, and line 150 to the soaking drum 151 and the other portion passing through the heat exchanger 148 and cooler 155 whereby the temperature of the product stream is reduced from about 200° F. to about 100° F. The cooled product stream in line 152 is passed in series through the acid settler 156 and the polymer settler 157, line 158 being provided to effect the transfer between the two settlers. Some of the acid from the acid settler 156 is returned via lines 159 and 160, together with fresh ma. .-up acid, to the acid absorber 140 via line 141. Another portion of the separated acid from settler 156 is recirculated via line 162, pump 163, and lines 146 and 150 to soaking drum 151. Spent acid is withdrawn from the system via line 161.

In the polymer settler 157 a heavy product can be withdrawn via line 164 and another fraction of the polymer product can be withdrawn via line 165 and introduced into debutanizer 166. Prior to introduction into the debutanizer 166 the hydrocarbon fraction can be caustic-treated by the introduction of a 2% by weight caustic solution into the line 165 by line 167.

The debutanizer 166 is provided with a reboiler 168 and can be operated at a pressure of about 250 pounds per square inch with a vapor outlet temperature of about 125° F. The overhead in line 174 from the debutanizer 166 comprising substantial amounts of propylene is cooled in cooler 169 to a temperature of about 110° F., liquids being accumulated in drum 170. Condensate water can be withdrawn via line 171 and the liquefied hydrocarbons via line 172. A portion of the hydrocarbon condensate is returned via line 173 to the debutanizer 166 as reflux and the remainder is recycled to the polymerization reactor 151 by lines 172, 146 and 150.

The total polymer is removed from the debutanizer 166 as bottoms and is introduced into caustic wash tank 176 via line 177 at a temperature of about 350° F. and under a pressure of about 250 pounds per square inch. In the caustic wash tank 176 the hydrocarbons are treated with hot dilute caustic to break up any residual acid ester. It is contemplated that the caustic solution can be recycled by pump 178 and line 179 and that the spent caustic can be removed from the wash drum 176 by line 180.

The caustic-washed polymer is introduced into rerun tower 181 via line 182 where a motor gasoline fraction and a fuel oil cut are recovered. The rerun tower can be operated with an outlet temperature of about 180° F. under a pressure of about five pounds per square inch and a bottom temperature of about 425° F. The overhead in line 183 from rerun tower 181 is cooled in cooler 184 to a temperature of about 115° F. and a motor gasoline fraction accumulated in accumulator 185. Steam is introduced into the rerun tower 181 at a low point via line 186 and steam condensate separated in the accumulator 185 is withdrawn via line 187. A portion of the gasoline fraction from accumulator 185 can be returned via line 188 near the top of the rerun tower 181 as reflux and the net production of polymer gasoline withdrawn from the system via pump 189 and line 190 through cooler 191 at a temperature of about 100° F. The fuel oil cut is recovered as bottoms from the rerun tower 181 at a temperature of about 425° F., is cooled by cooler 192 to about 100° F. and withdrawn from the system via line 193.

Another modification of the reformer apparatus is illustrated in Figures 2, 3 and 4 of the drawings. The reformer comprises an outer cylindrical shell 200 having an internal insulation of refractive material 201 such as fire-brick. The top of the chamber 200 is provided with a divided header 202, each of baffles or partitions 203 restricting the introduction of a selected gas to a given bank of tubes 204, 205, or 206. Separate inlets 207, 208, and 209 supply the gases to the header 202. The tubes 204 and 206 are supported by upper tube sheet 210 and lower annular tube sheet 211. The lower tube sheet 211 is supported on angle-iron 212 with asbestos gasketing 214 between the sheet 211 and angle-iron 212 to allow for downward expansion of the tubes along bolts 213, the angle-iron 212 being shaped to the contour of the chamber 200. An inner vessel 215 is adapted to retain the catalyst and is fixed at its upper end to the annular tube sheet 211. Stub spacers 216 are carried by the inner vessel 215. The inner vessel 215 is corrugated at 217 to allow for expansion or contraction. It will be noted that the inner vessel or canister 215 is fixed to the lower tube sheet 211 and that the expansion of the tubes 204 and 206 over the bolts 213 is transmitted to the corrugated portion 217 of the inner vessel 215.

The lower end of the inner vessel 215 is provided with an alloy screen 218 over a refractory brick grid 219. This brick grid 219 extends upwardly into the inner shell 215 for about six inches, the brick grid and the inner vessel 215 being supported by brick arches 220. These arches are in the primary reaction zone 221 and the hot combustion gases pass around these arches before entering the inner vessel 215 through grid 219 and screen 218. Figure 4, which is a view taken along 4—4 in Figure 2, illustrates the details of this arrangement.

The reformer illustrated in Figure 2 operates in essentially the same manner as that illustrated in Figure 1. The gases are introduced via the inlets 207, 208, and 209 and are preheated separately in the corresponding tubes to a temperature of at least 1500° F. The thus preheated gases pass downwardly from the preheat tubes around the inner vessel 215 and into the reaction space 221. The partially reacted gases from the reaction zone 221 are thoroughly mixed in passing through the arches 220, grid 219, and screen 218 and enter the inner vessel 215 which retains a bed of catalyst 222. In passing through the catalyst bed, the conversion of residual methane, carbon dioxide, and water vapor to hydrogen and carbon monoxide is effected. A suitable catalytic material for this duty can be any one or more of those known in the prior art, for example, nickel on a refractory support.

The product gases leave the inner vessel 215 and pass upwardly through the preheat zone 223 countercurrently to the incoming gases. A temperature of about 1900° F. is maintained within the catalyst bed 222 and heat is extracted from the reaction products by the incoming gases in tubes 204, 205 and 206 to attain a preheat temperature above about 1500° F., for example, about 1625° F. If desired, disc and doughnut baffles 224 can be provided within the preheat zone 223. The product gases, in effecting this preheat of feed gases, leave the chamber 200 via line 225 at a temperature of about 1000° F. and under a pressure of above about 200 pounds per square inch.

A suitable method for bringing such a reformer on stream includes charging cold air and gas to burners 226 in the reaction zone 221 until the catalyst bed 222 and the interior of the chamber have been heated to the desired operating temperature. Initial temperature control can be obtained by admitting additional methane through the preheating coils or tubes and as soon as a temperature above about 1500° F. is attained, the normal operation described above can be followed.

Figure 5 diagrammatically illustrates a further embodiment of a reformer furnace which can be employed in my system. The apparatus illustrated comprises a chamber 230 having a refractory insulation 231 and being divided into several zones including a preheat zone 232, initial reaction zone 233 and catalytic reaction zone 234. Insulation 242 can be provided about the preheat chambers 238, 239, and 240 which insulation surrounds the catalyst zone 234. It is contemplated, however, that separate insulation means can be used about each of the preheat zones 238, 239 and 240.

The feed gases are supplied separately by inlets 235, 236, and 237 to preheat zones 238, 239 and 240 which may comprise tubes or bundles of tubes within the preheat zone 232 in a lower portion of the chamber 230. The catalyst bed 234 is retained on a screen or perforated member 241, the arches 243 supporting the assembly within the chamber 230. Alternatively a water-cooled metal grid can be used in the place of screen 241 and the arches 243.

The preheated gases by-pass the catalyst chamber 234 and are commingled within the initial reaction zone 233. If desired a plurality of mixing devices can be employed and this is particularly desirable when each of the preheat zones 238, 239 and 240 comprises a bundle of tubes. The initial reaction products pass downwardly through the catalyst bed 234, through the screen or grid 241 and into the preheat zone 232 wherein the incoming gases within the preheat zones 238, 239, and 240 are heat-exchanged with the product gases in a manner similar to that described in connection with the other modifications of the reformer furnace. The relatively cooled reaction products are withdrawn from a low point in the reformer 230 through ports 244.

From the above detailed description it will be apparent that the objects of this invention have been accomplished and that a vastly improved system for synthesizing normally liquid hydrocarbons from carbon monoxide and hydrogen derived from natural gas has been provided. Although the flow diagram has been described with reference to a single reformer and a single synthesis reactor, it is contemplated that a plurality of such reactors and gas reformers can be used in series or parallel. For example, in one process design involving the principle of this invention two reformers and three hydrocarbon synthesis reactors were employed.

Although certain preferred embodiments of apparatus and operating conditions have been described to illustrate the invention, it should be understood that various other modifications and operating conditions will be suggested to those skilled in the art without departing from the scope of the invention. Accordingly the details are not to be construed as limiting the invention and it is intended that the scope of the invention be defined by the appended claims.

What is claimed is:

1. In the reforming of methane with air and carbon dioxide to produce hydrogen and carbon monoxide, the improvement which comprises preheating separately confined streams of methane, air, and carbon dioxide and avoiding coke deposits in the separately confined preheating zones by passing successively therethrough, methane, carbon dioxide, air and carbon dioxide whereby coke produced in the preheating of methane is oxidized by the air and each zone is purged by carbon dioxide before and after the introduction of air.

2. Apparatus for the production of mixtures of hydrogen and carbon monoxide from natural gas which comprises a vertically elongated reaction chamber, a header at one end of said chamber, partitions within said header dividing it into at least three sections, separate inlets for each of said sections, a bank of tubes communicating with each of said header sections, an upper tube sheet supporting said tubes and closing one end of said chamber, a lower annular tube sheet fixed to the lower end of said tubes, an expansion joint means for supporting said lower tube sheet, an open-ended, substantially cylindrical vessel within said chamber and spaced from the inner wall thereof, the upper end of said vessel being fixed to said annular tube sheet, a screen across the flow area of the lower end of said cylindrical vessel, a grid means supporting said screen, a perforated arch support means for said grid and cylindrical vessel said perforated means being spaced from that end of the chamber which is remote from said header, and a gas outlet means from said chamber remote from said annular tube sheet.

3. In a method for making synthesis gas from methane wherein a gaseous mixture of hydrogen and carbon monoxide is produced by the controlled oxidation of gaseous hydrocarbons, the improvement which comprises preheating separately confined streams of gaseous hydrocarbons, of air, and of carbon dioxide to a temperature above about 1500° F., commingling the separately preheated streams to effect combustion of a portion of the hydrocarbon gases to produce water vapor and additional carbon dioxide, reacting the residual hydrocarbon gases with carbon dioxide and water vapor in the presence of a reforming catalyst at a temperature within the range of between about 1800–2200° F. whereby substantial proportions of hydrogen and carbon monoxide are produced, and avoiding the deposition of coke in the separately confined preheating zones by successively passing therethrough separate streams of gaseous hydrocarbons, of carbon dioxide, of air and of carbon dioxide, whereby any coke deposit produced in the preheating of the hydrocarbon gases is oxidized by the air and each zone is purged by carbon dioxide between the air and hydrocarbon gas preheating steps.

4. An apparatus for the two-stage conversion of natural gas to produce mixture of hydrogen and carbon monoxide which comprises a vertically elongated shell, a header in the upper part of said shell, partitions within said header dividing it into a plurality of sections, inlets for supplying a separate stream of reactant gas to each section of said header, an annular tube-sheet intermediate the ends of said shell, separate tubes within said shell communicating with each section of said header and extending downwardly to said tube-sheet for discharging said gases into an annular space below said tube-sheet, an open-ended canister having upper and side walls for retaining a quantity of catalyst intermediate the ends of said shell below said tube-sheet, the upper walls of the canister extending to said tube-sheet, the side walls of the canister being spaced from the side walls of the shell to form said annular space, and the bottom of the canister being spaced from the bottom of the shell to form a reaction space, said reaction space communicating with said annular space and said canister to provide a path of flow for gases discharged from said tubes whereby gases from said tubes flow thru said annular space, then thru said reaction space, then upwardly through said quantity of catalyst and finally around and in heat exchange relationship with said tubes, and an outlet for withdrawing gases from the upper part of the shell.

JOHN A. PHINNEY.

REFERENCES CITED

The following references are of record in the file of this patent:

UNITED STATES PATENTS

| Number | Name | Date |
|---|---|---|
| 1,843,063 | Burke | Jan. 26, 1932 |
| 2,051,363 | Beekley | Aug. 18, 1936 |
| 2,185,989 | Roberts | Jan. 2, 1940 |
| 2,210,257 | Pyzel et al. | Aug. 6, 1940 |
| 2,243,869 | Keith | June 3, 1941 |
| 2,258,511 | Leprestre | Oct. 7, 1941 |
| 2,274,064 | Howard | Feb. 24, 1942 |
| 2,319,508 | Leprestre et al. | May 18, 1943 |
| 2,324,172 | Parkhurst | July 13, 1943 |
| 2,347,682 | Gunness | May 2, 1944 |

FOREIGN PATENTS

| Number | Country | Date |
|---|---|---|
| 288,662 | Great Britain | Apr. 16, 1928 |